(12) United States Patent
Lin (10) Patent No.: US 11,661,136 B1
(45) Date of Patent: May 30, 2023

(54) FOLDABLE PEDAL

(71) Applicant: VP Components Co., Ltd., Taichung (TW)

(72) Inventor: Wen-Hwa Lin, Taichung (TW)

(73) Assignee: VP COMPONENTS CO., LTD., Taichung (TW)

( * ) Notice: Subject to any disclaimer, the term of this patent is extended or adjusted under 35 U.S.C. 154(b) by 0 days.

(21) Appl. No.: 17/854,547

(22) Filed: Jun. 30, 2022

(51) Int. Cl.
*B62M 3/08* (2006.01)

(52) U.S. Cl.
CPC ........................... *B62M 3/08* (2013.01)

(58) Field of Classification Search
CPC .............................................. B62M 3/08
USPC .............................................. 74/594.7
See application file for complete search history.

(56) References Cited

U.S. PATENT DOCUMENTS

| | | | | |
|---|---|---|---|---|
| 1,087,258 | A * | 2/1914 | Reynolds et al. | B62M 3/08 74/594.7 |
| 1,091,405 | A * | 3/1914 | Trambley | B62M 3/08 74/594.7 |
| 3,541,884 | A * | 11/1970 | Nogradi | B62M 3/08 74/594.7 |
| 2007/0137432 | A1* | 6/2007 | Chen | B62K 15/006 74/594.7 |
| 2007/0209474 | A1* | 9/2007 | Lin | B62M 3/08 482/57 |
| 2008/0229876 | A1* | 9/2008 | Hsieh | B62M 3/08 74/594.7 |

FOREIGN PATENT DOCUMENTS

| | | | | |
|---|---|---|---|---|
| CN | 201439372 U | * | 4/2010 | ............. B62M 3/00 |
| GB | 572157 | * | 10/1943 | ............. B62M 3/08 |
| JP | 2001206272 A | * | 7/2001 | ............. B62M 3/08 |
| JP | 3520538 P | * | 2/2004 | ............. B62M 3/08 |
| TW | M502632 | | 6/2015 | |

OTHER PUBLICATIONS

Machine translation of CN 201439372 U, Lin, Apr. 21, 2010 (Year: 2010).*

* cited by examiner

*Primary Examiner* — Vinh Luong
(74) *Attorney, Agent, or Firm* — Muncy, Geissler, Olds & Lowe, P.C.

(57) ABSTRACT

A foldable pedal includes a connection member, a shaft, a pedal body, and an engagement device. The connection member includes a first and a second connection ends along a first axis. The shaft includes a first and a second ends. The first end is pivotally connected with the second connection end along a second axis perpendicular to the first axis, so that the shaft pivots with respect to the connection member. The pedal body includes a shaft bore receiving the second end. The engagement device is on the connection member and switches between engagement and release positions. At the engagement position, the engagement device is engaged with the first end, and the shaft is coaxial with the first axis. At the release position, the pedal body is foldable to the crank, preventing direct effect of pedaling force and reducing distance between the pedal and the crank.

12 Claims, 10 Drawing Sheets

FOLDABLE PEDAL

BACKGROUND OF THE INVENTION

1. Field of the Invention

The present invention relates to pedals, and more particularly, to a foldable pedal which is folded to reduce volume for facilitating transportation.

2. Description of the Related Art

As disclosed by Taiwan patent M502632, a foldable pedal for bicycle is disclosed, comprising a connection member, a rotation member, and a shaft, with two elastic members disposed between the connection member and the rotation member. When being folded, the user grips the rotation member and push it toward the distal end, and the rotation pillar compresses the elastic member, such that the cross bolt leaves the cross-shaped groove, and the rotation member is rotated to the needed angle with the rotation pillar as the rotation shaft, thereby completing the folding process.

However, the distance from the rotation pillar to the crank remains relatively longer, so that when the pedal is folded, there is still a certain distance between the frame-shaped rotation member and the crank of the bicycle. As a result, the overall volume of the bicycle is not effectively reduced even after the pedal being folded, which fails to facilitate the package and transportation operation of the manufacturer. Also, the folding structure of the pedal is within the range of the rotation member, and it includes many components. After bearing the repeatedly imposed pedaling force by the user, the service life of components is easily affected. Further, the length of the shaft applied by such pedal is relatively shorter, failing to provide an optimal supporting force to the pedal.

SUMMARY OF THE INVENTION

To improve the issues above, the present invention discloses a foldable pedal, wherein the engagement device is disposed on the connection member, which effectively prevents the direct effect caused by the pedaling force and increases the service life of the engagement device.

For achieving the aforementioned objectives, an embodiment of the present invention provides a foldable pedal, comprising a connection member, a shaft, a pedal body, and an engagement device. The connection member comprises a first connection end and a second connection end arranged in opposite to the first connection end along a first axis. The shaft comprises a first end and a second end arranged in opposite to the first end. The first end is pivotally connected with the second connection end along a second axis perpendicular to the first axis, so that the shaft is allowed to pivot with respect to the connection member. The pedal body comprises a shaft bore for receiving the second end of the shaft, and the shaft rotates with respect to the shaft bore. The engagement device is disposed on the connection member, and switches between an engagement position and a release position. At the engagement position, the engagement device is engaged with the first end of the shaft, so that the shaft is in coaxial alignment with the first axis. At the release position, the pedal body folds with respect to the crank.

With such configuration, the engagement device of the present invention is disposed between the first connection end and the pivot point, such that the folded pedal is arranged closer to the crank, effectively reducing the overall volume, facilitating the packaging and transportation of the bicycle.

The aforementioned contents and other objectives, technical features and advantages of the present invention will be best understood referring to following detailed description, embodiments, and attached drawings

DETAILED DESCRIPTION OF THE INVENTION

Embodiments of the present invention are illustrated in detail along with the drawings. However, the technical features included by the present invention are not limited to certain embodiments hereby provided. Scope of the present invention shall be referred to the claims, which include all the possible replacements, modifications, and equivalent features.

Referring to FIG. 1 to FIG. 10, the present invention provides a foldable pedal 100, comprising a connection member 10, a shaft 20, a pedal body 30, and an engagement device 40.

Figure 3:
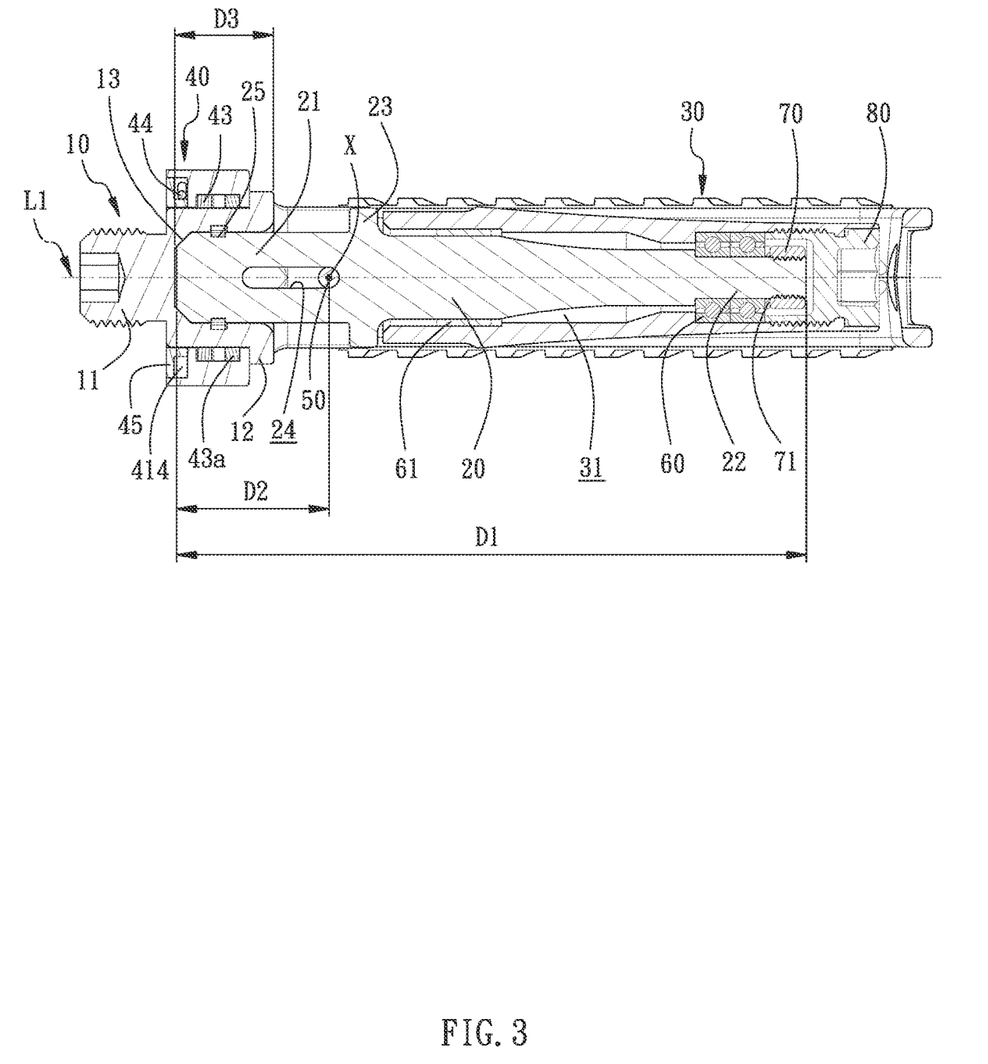
FIG. 3 is a cross-sectional view taken along line 3-3 in FIG. 1, illustrating the shaft and the first axis being arranged in coaxial alignment, and the present invention being in the unfolded status.

The connection member 10 comprises a first connection end 11 and a second connection end 12 arranged in opposite to the first connection end 11 along a first axis L1. In the embodiment, the first connection end 11 is provided with an outer thread for screwing a crank 1 of a bicycle. The second connection end 12 comprises a combination bore 13 on the first axis L1 toward the first end 11. Each of the two sides of the connection member 10 comprises a through groove 14 passing therethrough the combination bore 13. Also, the second connection end 12 of the connection member 10 comprises a receiving space 121 passing through the combination bore 13. The receiving space 121 comprises a blocking portion 122. The second connection end 12 further comprises a pivot bore 15 along a second axis L2 perpendicular to the first axis L1. Therein, as shown by FIG. 3, the first axis L1 crosses the second axis L2 at a pivot point X. The center of the pivot bore 15 and the pivot point X are concentric.

Figure 9:
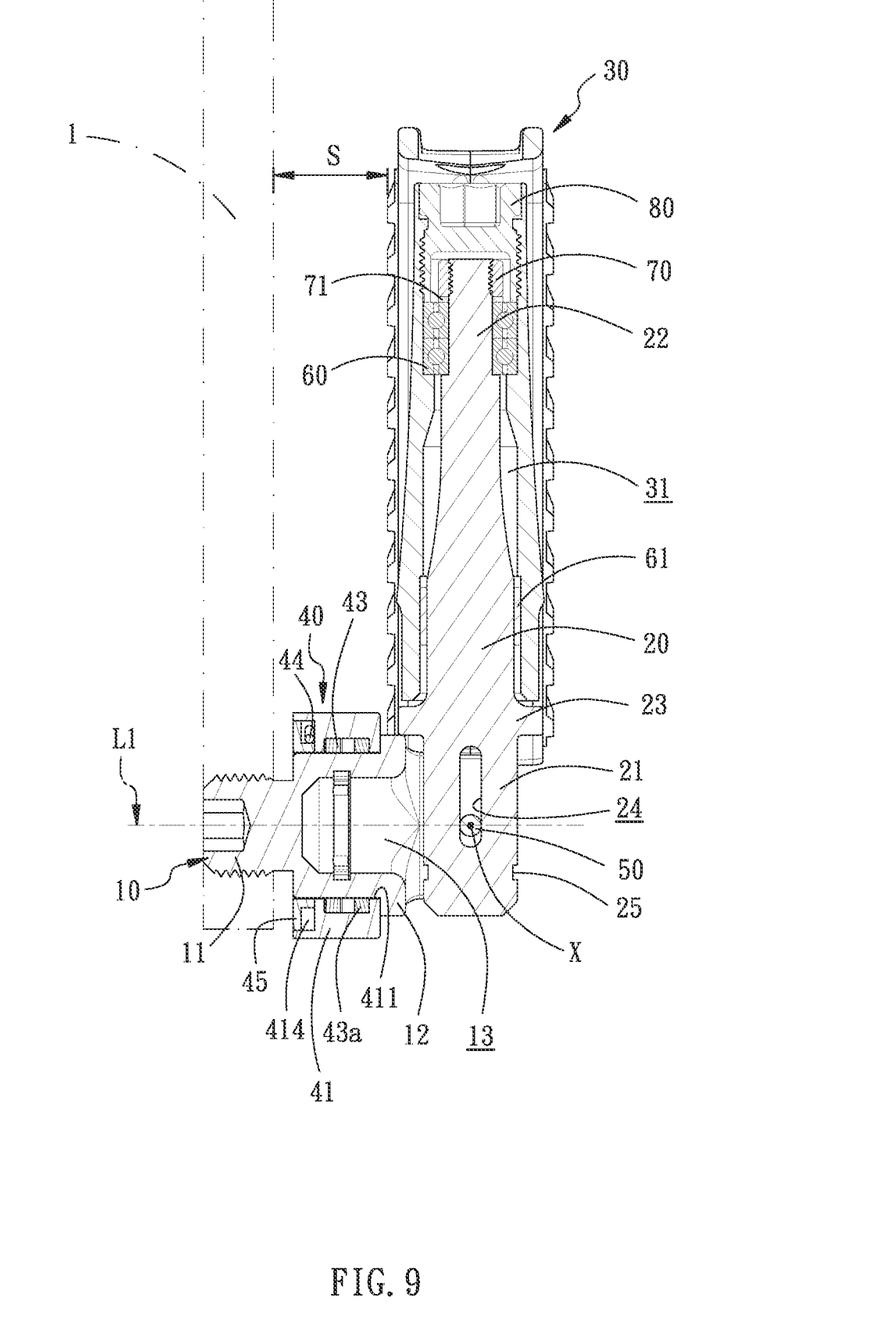
FIG. 9 is a schematic view of the status of the foldable pedal, illustrating the shaft being pivotally arranged in perpendicular with respect to the first axis, and the present invention being in the folded status.

The shaft 20 comprises a first end 21 and a second end 22 arranged in opposite to the first end 21, with a protrusion ring 23 disposed between the first end 21 and the second end 22. The end surface length from the protrusion ring 23 to the first end 21 is smaller than the end surface length from the protrusion ring 23 to the second end 22. The first end 21 is pivotally connected with the second connection end 12 along the second axis L2, and the first end 21 passes through the receiving space 121, such that the shaft 20 pivots with respect to the connection member 10. In the embodiment, the first end 21 of the shaft 20 comprises a slide groove 24 and a ring groove 25 disposed along the axial direction. The shaft 20 passes through the slide groove 24 and the pivot bore 15 of the second connection end 12 of the connection member 10 through a pivot axle 50. Referring to FIG. 3, which illustrates the unfolded status of the present invention, the pivot axle 50 is at a first position of the slide groove 24, and the slide groove 24 is parallel to the first axis L1. Referring to FIG. 9, which illustrates the folded status of the present invention, the pivot axle 50 is at a second position of the slide groove 24, and the slide groove 24 is perpendicular to the first axis L1 and the second axis L2. Therein, the length of the shaft 20 is defined as D1, the length from the pivot point X to the end edge of the first end 21 is defined as D2, D2 is smaller than D1, and D2 is smaller than a half of D1. Also, the depth of the combination bore 13 is defined as D3, and D2 is larger than D3.

The pedal body 30 comprises a shaft bore 31 passing therethrough for receiving the second end 22 of the shaft 20. Also, the shaft 20 rotates with respect to the shaft bore 31. In the embodiment, two bearings 60 are mounted around the second end 22 of the shaft 20 for providing a supporting effect in the shaft bore 31. The bearing 60 comprises an anti-loosening screw member 70 and a washer 71 disposed on one side thereof. The screw member 70 is screwed to the second end 22 for preventing the shaft 20 from leaving the shaft bore 31. The washer 71 is mounted between the bearing 60 and the anti-loosening screw member 70 for increasing the contact area. Also, the shaft 20 comprises a support ring 61 between the first end 21 and the second end 22 for providing a supporting effect in the shaft bore 31, such that the shaft 20 is simultaneously supported by the bearing 60 and the support ring 61, whereby the shaft 20 is able to rotate with respect to the pedal body 30. A fastening screw member 80 is screwed to an end of the shaft bore 31 away from the connection bore 10 for closing the shaft bore 31, so that the shaft bore 31 is not exposed.

Figure 4:
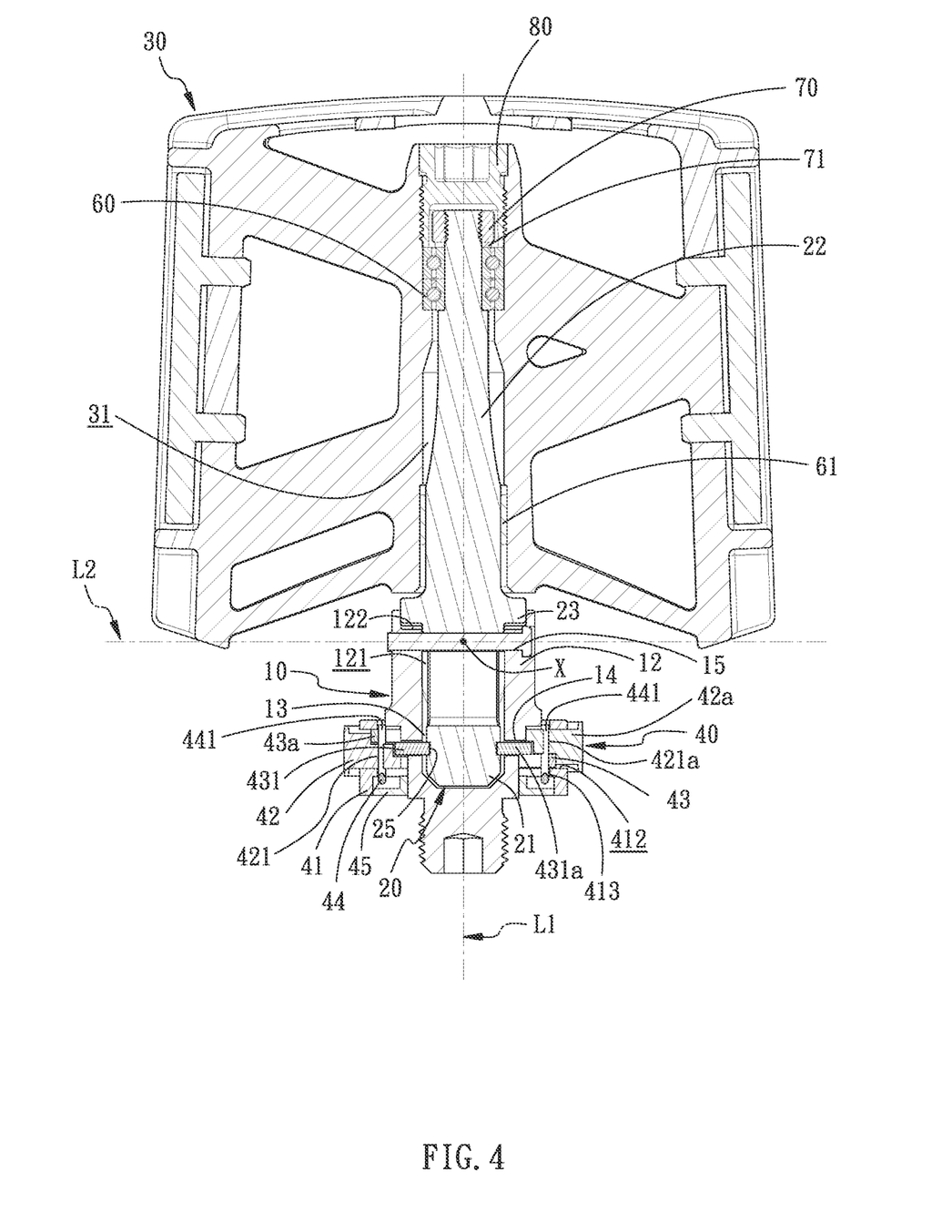
FIG. 4 is a cross-sectional view taken along line 4-4 in FIG. 1, illustrating the engagement device at the engagement position.

Therein, the protrusion ring 23 of the shaft 20 is disposed on the outer side of the shaft bore 31. As shown by FIG. 4, the block portion 122 of the connection member 10 prevents the protrusion ring 23 of the shaft 20 from completely entering the receiving space 121. Because the length of the end surface from the protrusion ring 23 to the first end 21 is smaller than the length of the end surface from the protrusion ring 23 to the second end 22. Also, the length of the shaft 20 in the pedal body 30 is larger than a half of the length of the pedal body 30. Therefore, the second end 22 of the shaft 20 has a sufficient length for providing a sufficient supporting force for effectively bearing the pedaling force imposed on the pedal body 30.

Figure 5:
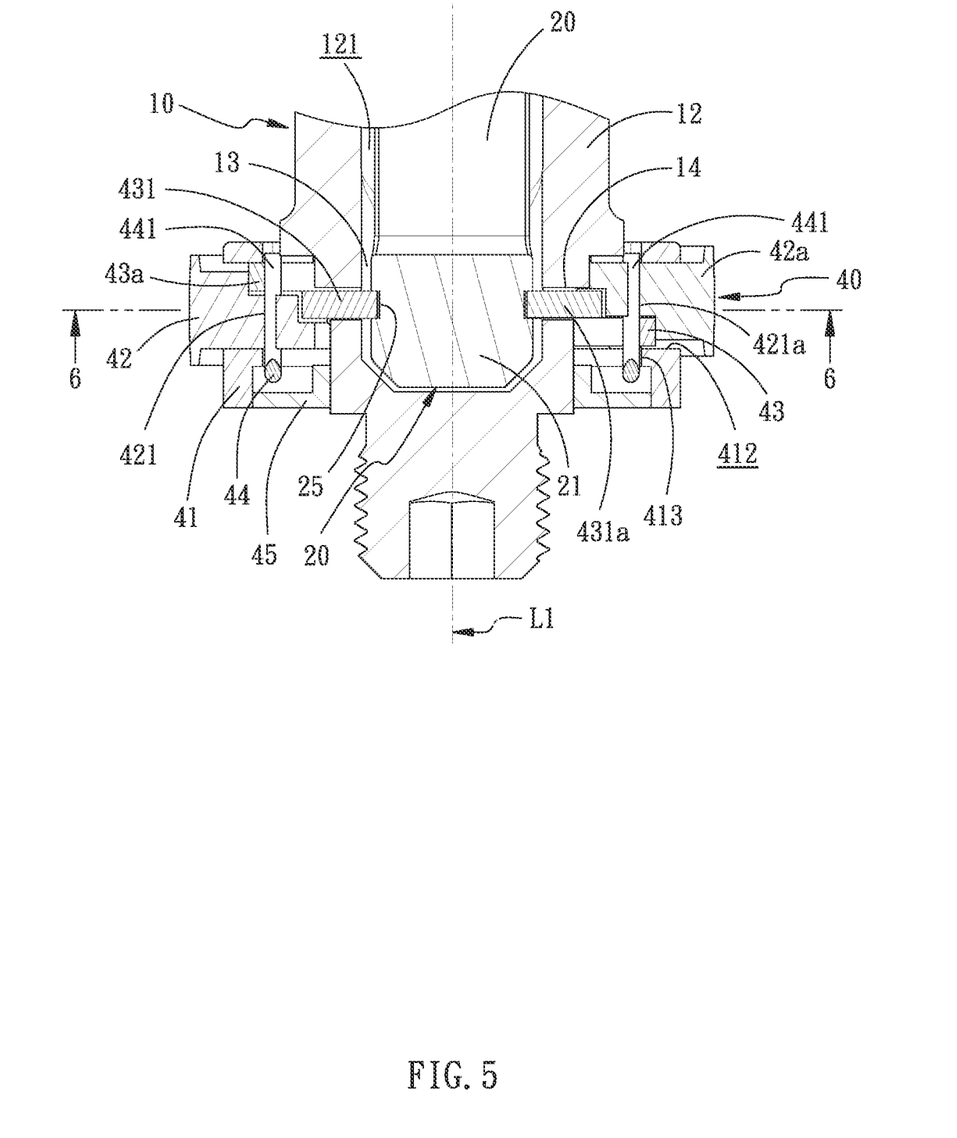
FIG. 5 is a partially enlarged view of FIG. 4, illustrating the engagement portion of the foldable pedal being engaged on two sides of the shaft.

The engagement device 40 is disposed on the connection member 10 and switches between an engagement position and a release position. Referring to FIG. 4 and FIG. 5, when the engagement device 40 is at the engagement position, the engagement device 40 is able to be engaged with the first end 21 of the shaft 20, so that the shaft 20 and the first axis L1 are arranged in coaxial alignment, and the pivot axle 50 is at the first position. Referring to FIG. 9, when the engagement device 40 is at the release position, the pivot axle 50 is at the second position, so that the pedal body 30 is able to be folded about the pivot point X with respect to the crank 1. Therein, the engagement device 40 and the pivot point X are on the outer side of the pedal body 30, and the engagement device 40 is between the first connection end 11 and the pivot point X. In other words, the second axis L2 does not pass through the engagement device 40. Thus, the engagement device 40 is not disposed in the pedal body 30, so as to be prevented from directly bearing the pedaling force, thereby increasing the service life of the engagement device 40.

The engagement device 40 comprises a sleeve 41, two operation members 42, 42a, two engagement members 43, 43a, an elastic member 44, and a cover 45. The sleeve 41 comprises a sleeving bore 411 to be mounted around the connection member 10. The sleeve 41 comprises two installation grooves 412 disposed on two sides thereof and connected with the sleeving bore 411. The two installation grooves 412 face the positions of the two through grooves 14 of the connection member 10, and the two installation grooves 412 are applied to contain the two operation members 42, 42a therein. The sleeve 41 comprises two position limiting grooves 413 disposed on two sides of the sleeving bore 411 and connected therewith.

Each of the two operation members 42, 42a are formed in a half-moon shape. The two operation members 42, 42a are symmetrically disposed in the installation grooves 412 on two sides of the sleeve 41, and slidable in a direction perpendicular to the first axis L1. In the embodiment, each of the operation members 42, 42a comprises an insertion bore 421, 421a.

The two engagement members 43, 43a are disposed between the first end 21 of the shaft 20 and the two operation members 42, 42a. The two engagement members 43, 43a are formed in a ring shape and mounted around the connection member 10 to be overlapped on the first axis L1. Each of the engagement members 43, 43a comprises a concavely arc-shaped engagement portion 431, 431a. Also, a linkage portion 432, 432a is disposed in opposite to the engagement portions 431, 431a, and the linkage portions 432, 432a is formed in a notch.

The elastic member 44 comprises two foot ends 441 and an arc-shaped deformation portion 442 between the two foot ends 441, with a transition section 443 arranged between the deformation portion 422 and each of the foot ends 441, wherein the two transition sections 443 bend the two foot ends 441 to extend in a direction parallel to the first axis L1. The foot ends 441 passes through the insertion bores 421, 421a of the corresponding operation members 42, 42a, respectively, so as to be linked with the linkage portions 432, 432a of the corresponding engagement members 43, 43a.

The sleeve 41 comprises a combination groove 414 on one end, in which the cover 45 is combined, thereby achieving a dust-proof function and an aesthetic appearance of the engagement device 40.

Figure 1:
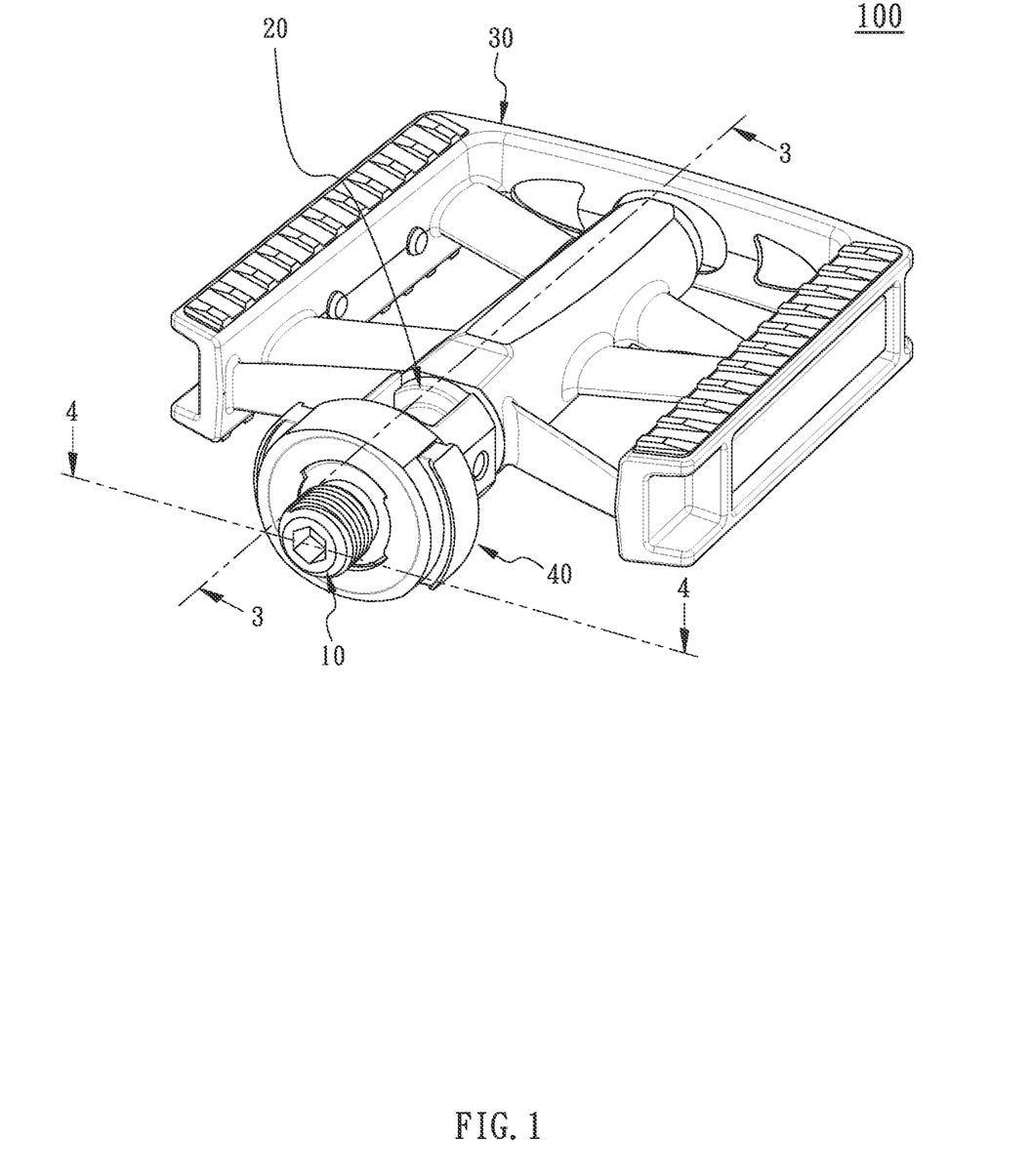
FIG. 1 is a perspective view of the foldable pedal in accordance with an embodiment of the present invention.
Figure 2:
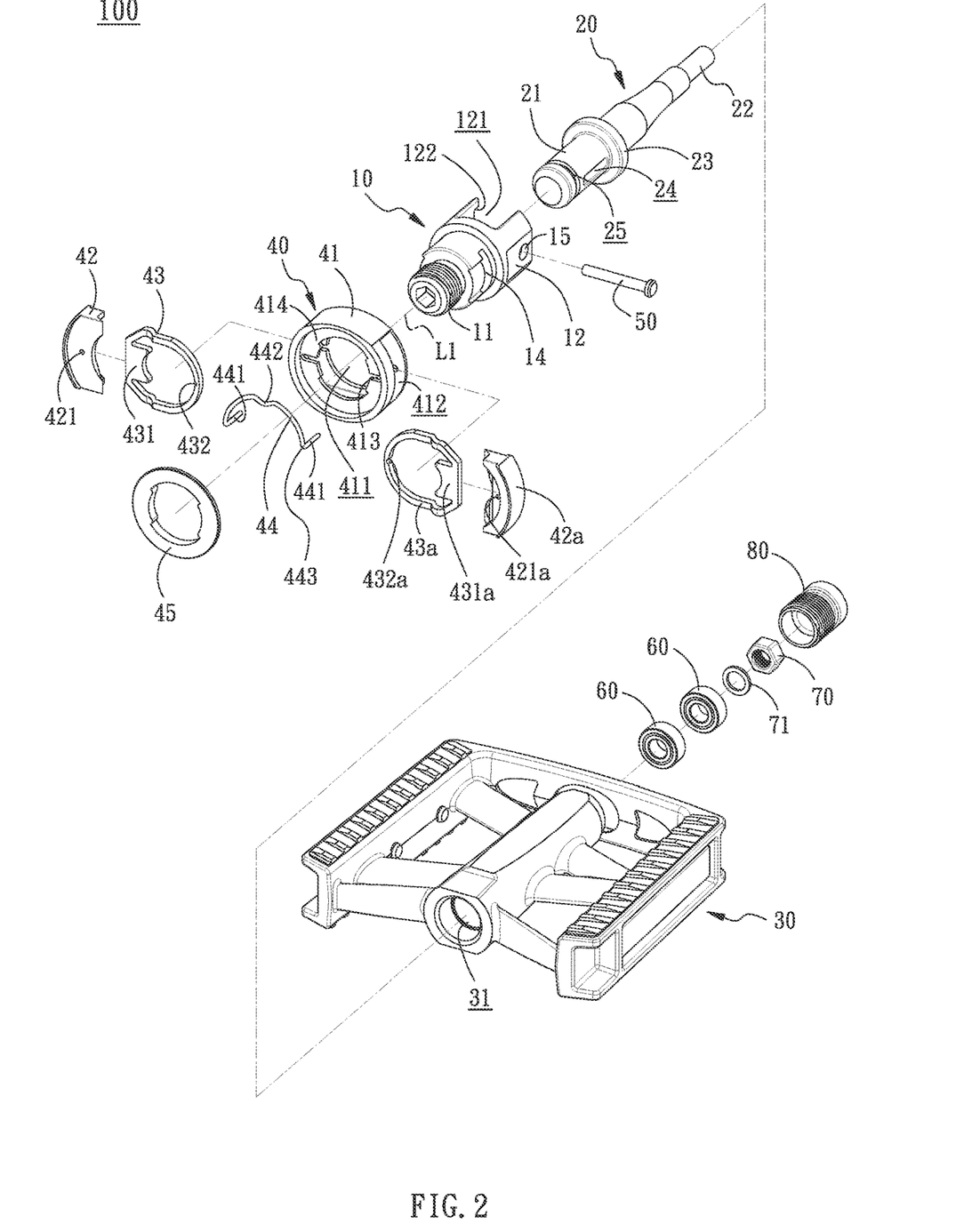
FIG. 2 is an exploded view of the foldable pedal in accordance with an embodiment of the present invention.
Figure 6:
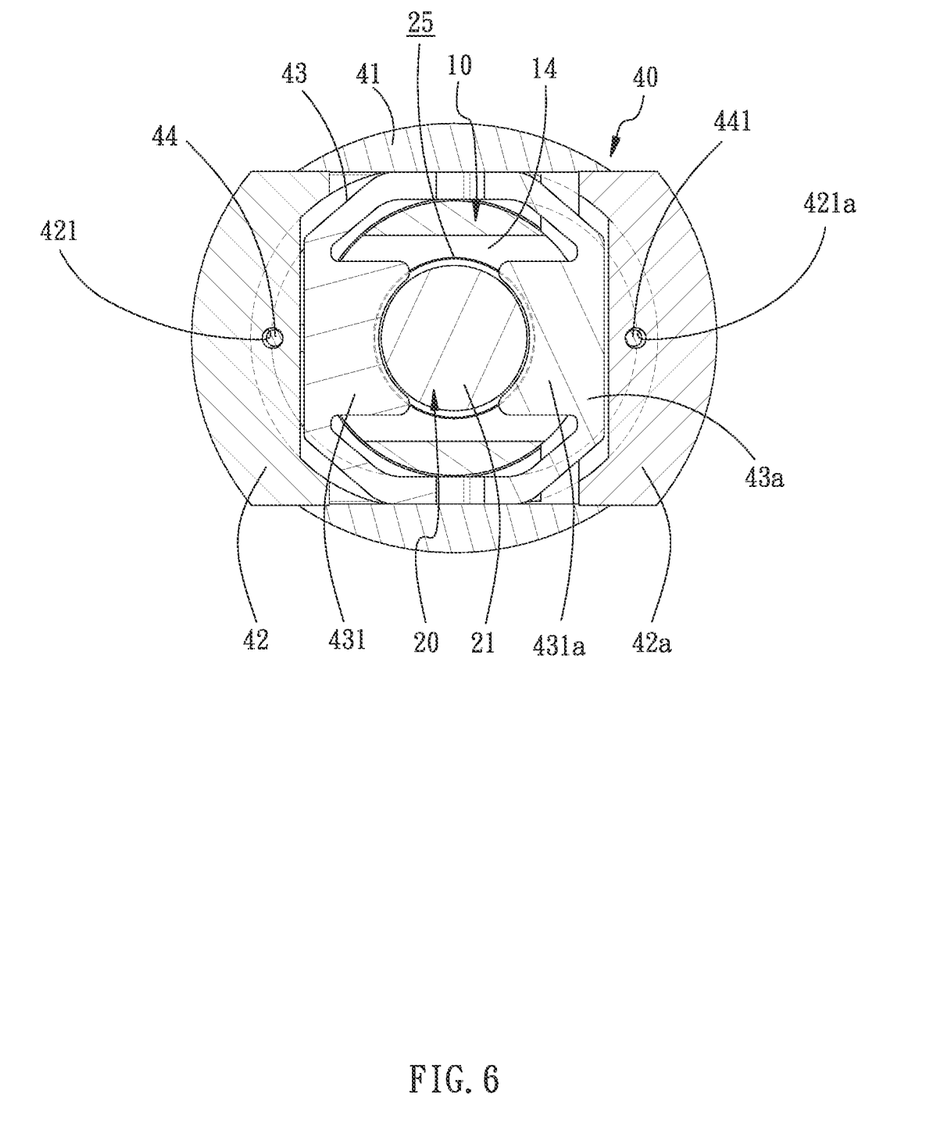
FIG. 6 is a schematic view of structure taken along line 6-6 in FIG. 5.

Referring to FIG. 5 and FIG. 6 in view of FIG. 2, at the engagement position, the two foot ends 441 abut in the two position limiting grooves 413, respectively, such that the elastic tension of the deformation portion 442 keeps the two operation members 42, 42a leaning away from the first axis L1. With the outward expanding of the two foot ends 441, the linkage portions 432, 432a of the engagement members 43, 43a leans in a direction away from the first axis L1, such that the engagement portions 431, 431a of the two engagement members 43, 43a permanently move toward each other to be engaged on two sides of the ring groove 25 of the shaft 20 through the through groove 14. At this position, the first end 21 of the shaft 20 is inserted in the combination bore 13. Therefore, the foldable pedal 100 is in the unfolded status to be pedaled by the user riding the bicycle, as shown by FIG. 1 and FIG. 4.

Figure 7:
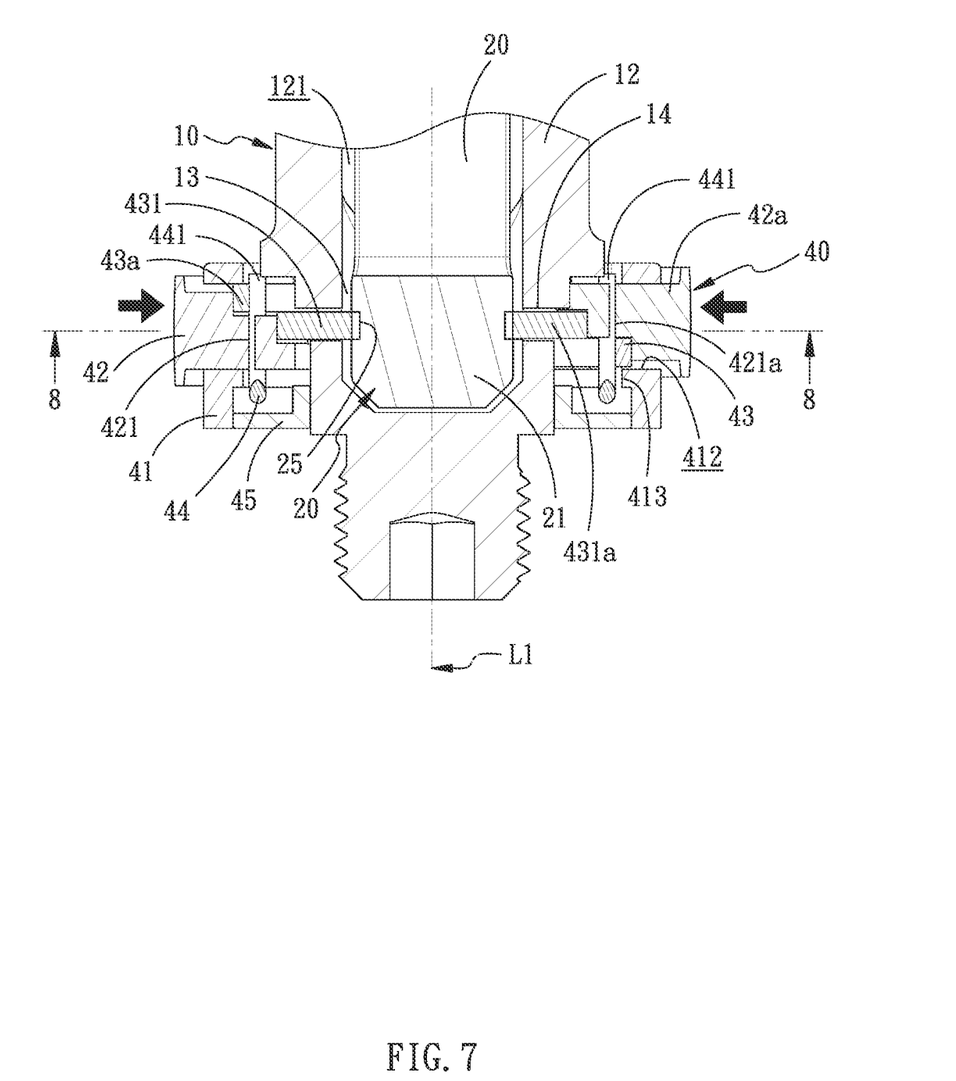
FIG. 7 is a schematic view of the operation of the engagement device, illustrating the two operation members being pressed, whereby the engagement member is disengaged with the shaft.
Figure 8:
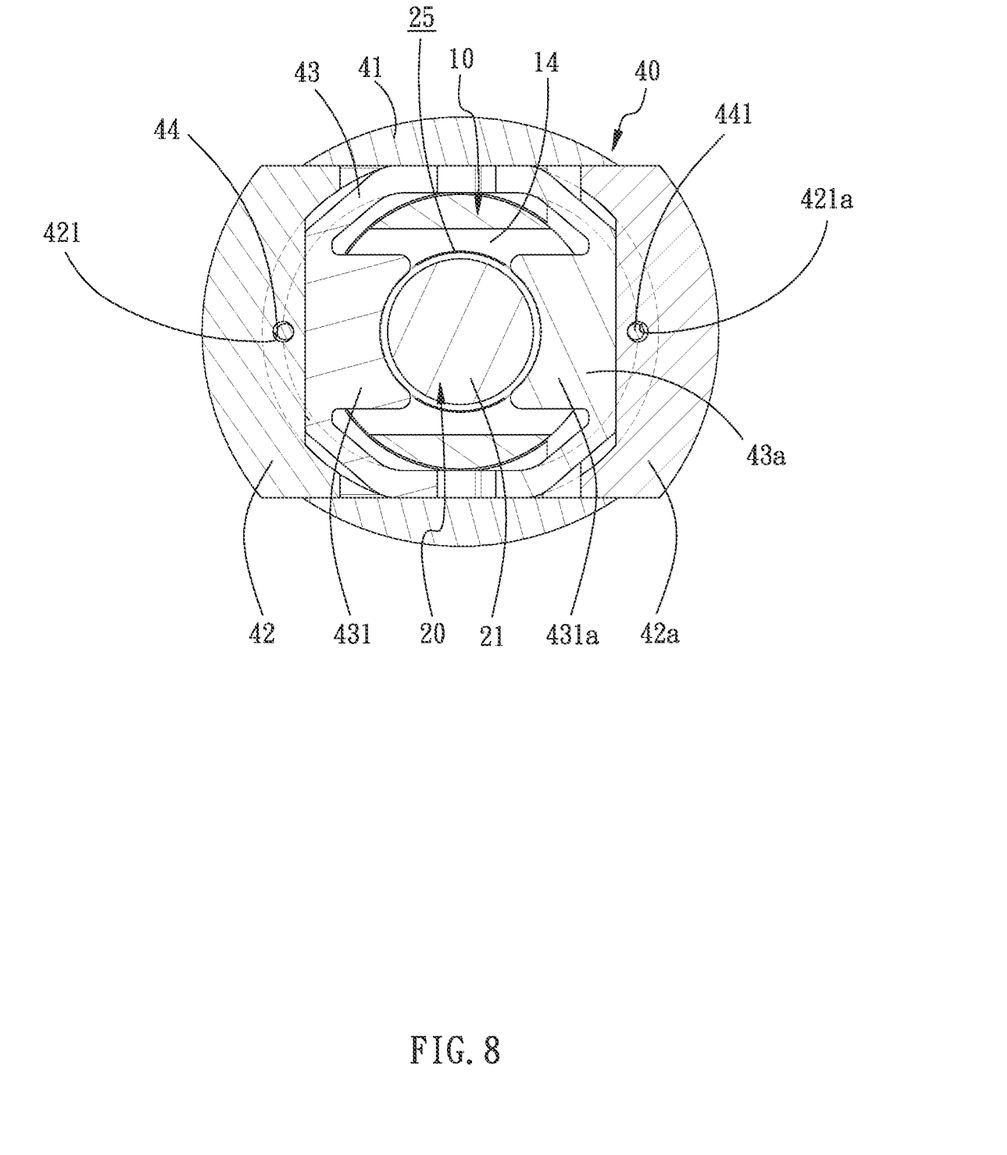
FIG. 8 is a schematic view of structure taken along line 8-8 in FIG. 7.

Referring to FIG. 7 and FIG. 8 in view of FIG. 2, when the two operation members 42, 42a are pressed by a force to slide perpendicularly in a direction to the first axis L1, the operation members 42, 42a cause the deformation portion 442 of the elastic member 44 to elastically deform, so that the two foot ends 441 respectively slide toward the first axis L1 along the two position limiting grooves 413, reducing the distance between the two foot ends 441, whereby the engagement device 40 changes from the engagement position to the release position. Meanwhile, the two foot ends 441 no longer abut against the linkage portions 432, 432a of the engagement members 43, 43a. Also, the two operation members 42, 42a simultaneously push the end edge of the linkage portions 432, 432a of the two engagement members 43 43a, forcing the engagement portions 431, 431a of the two engagement members 43, 43a to move in opposite directions, thereby releasing the engagement between the engagement portions 431, 431a and the ring groove 25 of the shaft 20. Therefore, the user is allowed to pull the pedal body 30 toward a direction in opposite to the combination bore 13, thereby pulling the first end 21 of the shaft 20 out of the combination bore 13. Next, the user turns the pedal body 30, such that the shaft 20 pivots to be arranged in a perpendicular alignment with respect to the first axis L1, whereby the pedal body is folded with respect to the crank 1. As shown by FIG. 9, after the folding process, the distance from the pedal body 30 to the crank 1 is defined as S. Therefore, the pedal body 30 is arranged relatively closer to the crank 1, effectively reducing the overall volume and facilitating the transportation of the bicycle.

Figure 10:
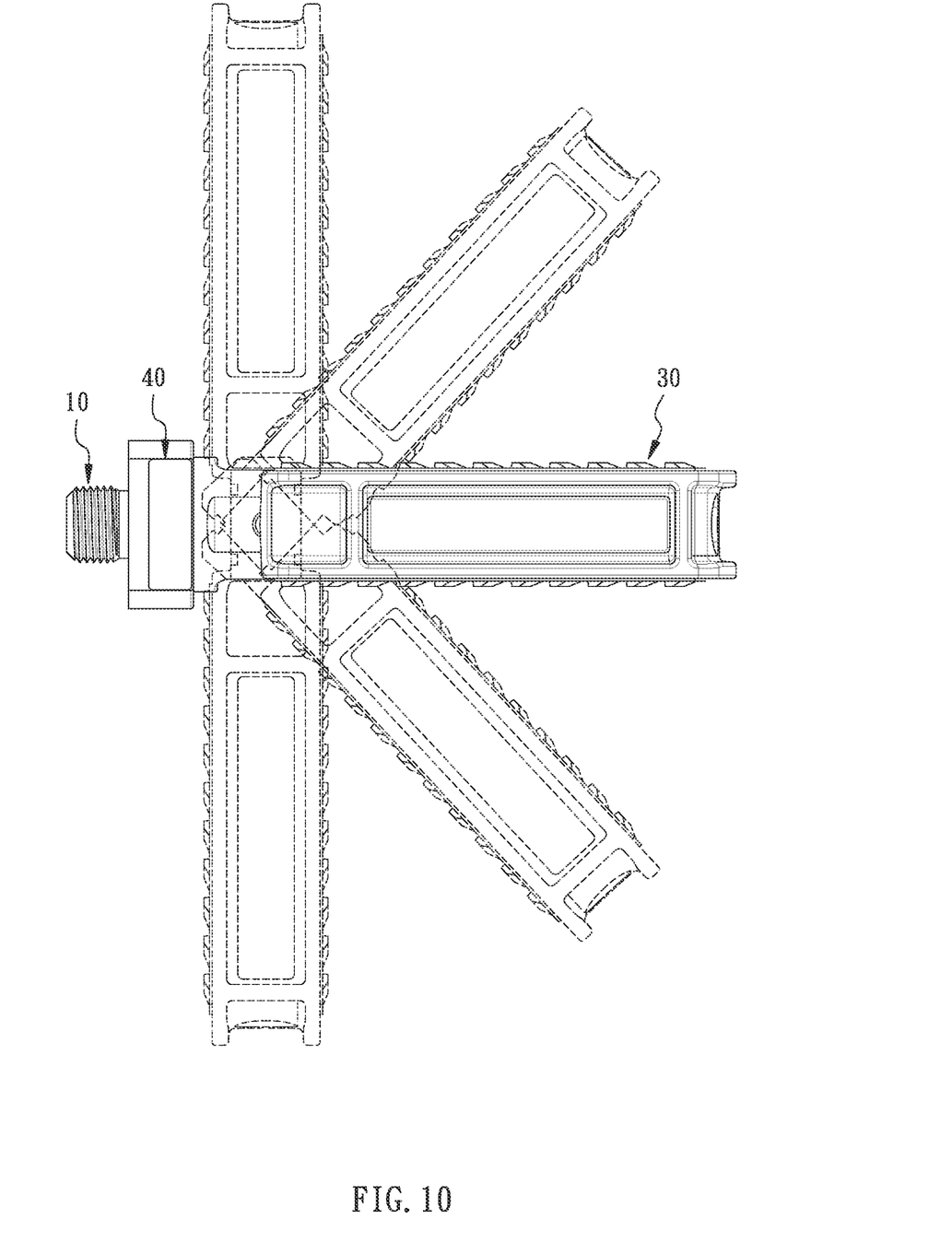
FIG. 10 is a schematic view of the operation of the foldable pedal.

Further, referring to FIG. 10, the pedal body 30 is allowed to be turned and folded upward in accordance with the directions shown in the drawing, so that the folded pedal faces upward; or alternatively, the pedal body 30 is allowed to be folded downward, so that the folded pedal faces downward. In other words, the pedal body 30 is able to be folded in different ways according to user's demand.

With the foregoing configuration, the present invention achieves following advantages.

The engagement device 40 of the present invention is disposed on the connection member 10, so as to prevent the pedal body 30 from the direct effect of the pedaling force and improves the service life of the engagement device 40.

The pivot point X of the present invention is located on the outer side of the pedal body 30, so that the pedal body 30 is arranged closer to the crank 1 after being folded, thereby reducing the overall volume and facilitating the transportation of the bicycle.

The length of the shaft 20 in the pedal body 30 is larger than a half of the length of the pedal body 30, so that the second end 22 of the shaft 20 has a sufficient length for providing a supporting force for effectively bearing the pedaling force imposed on the pedal body 30, achieving a greater structure strength.

Although particular embodiments of the invention have been described in detail for purposes of illustration, various modifications and enhancements may be made without departing from the scope of the invention. Accordingly, the invention is not to be limited except as by the appended claims.

What is claimed is:

1. A foldable pedal, comprising:
   a connection member comprising a first connection end and a second connection end arranged in opposite to the first connection end along a first axis, the second connection end comprising a combination bore on the first axis toward the first connection end;
   a shaft comprising a first end and a second end arranged in opposite to the first end, the first end being pivotally connected with the second connection end along a second axis which is perpendicular to the first axis, so that the shaft pivots with respect to the connection member, the first end of the shaft comprising a slide groove disposed along an axial direction;
   a pivot axle passing through between the slide groove and the second connection end along the second axis;
   a pedal body comprising a shaft bore for receiving the second end of the shaft, the shaft rotating with respect to the shaft bore;
   an engagement device disposed on the connection member and switches between an engagement position and a release position; when the engagement device is at the engagement position, the pivot axle is at a first position of the slide groove, the slide groove is parallel to the first axis, the first end of the shaft is inserted in the combination bore, and the engagement device is engaged with the first end of the shaft, such that the shaft is arranged in coaxial alignment with the first axis; when the engagement device is at the release position, the pivot axle is at a second position of the slide groove, the slide groove is perpendicular to the first axis and the second axis, the first end of the shaft is allowed to leave the combination bore, and the pedal body folds with respect to a crank.

2. The foldable pedal of claim 1, wherein the first axis crosses the second axis at a pivot point; the engagement device and the pivot point are arranged on an outer side of the pedal body, and the engagement device is between the first connection end and the pivot point; at the release position, the pedal body is folded about the pivot point with respect to the crank.

3. The foldable pedal of claim 1, wherein a protrusion ring is disposed between the first end and the second end of the shaft; the protrusion ring is on an outer side of the shaft bore; a length from the protrusion ring to an end surface of the first end is smaller than a length from the protrusion ring to an end surface of the second end; a length of the shaft in the pedal body is larger than a half of a length of the pedal body.

4. The foldable pedal of claim 3, wherein a bearing is mounted around the second end of the shaft for providing a supporting effect in the shaft bore; the bearing comprises an anti-loosening screw member on one side thereof and screwed to the second end; a support ring is disposed between the first end and the second end of the shaft for providing a supporting effect in the shaft bore.

5. The foldable pedal of claim 1, wherein the engagement device comprises a sleeve, two operation members, and two engagement members; the sleeve is mounted around the connection member; the two operation members are symmetrically disposed on two sides of the sleeve and slidable in a direction perpendicular to the first axis; the two engagement members are disposed between the first end of the shaft and the two operation members; at the engagement position, the two engagement members are engaged on two sides of the first end; when the two operation members slide perpendicularly in the direction to the first axis so that the engagement device changes to the release position, the two operation members release an engagement between the two engagement members and the first end of the shaft, such that the shaft is allowed to pivot to be arranged in a perpendicular alignment with respect to the first axis.

6. The foldable pedal of claim 5, wherein the first end of the shaft comprises a ring groove; each of two sides of the connection comprises a through groove passing therethrough the combination bore; each of the two engagement members comprises an engagement portion; at the engagement position, the two engagement portions of the two engagement members are engaged on two sides of the ring groove through the through grooves.

7. The foldable pedal of claim 6, wherein the sleeve comprises a sleeving bore to be mounted around the connection member; the sleeve comprises two installation grooves disposed on two sides thereof and connected with the sleeving bore, and the two installation grooves face the positions of the two corresponding through grooves; the two installation grooves are configured to contain the two operation members therein.

8. The foldable pedal of claim 7, wherein an elastic member is included; the elastic member comprises two foot ends and an arc-shaped deformation portion between the two foot ends; the two foot ends are connected with the two operation members; the deformation portion keeps the two operation members leaning away from the first axis, such that the two engagement portions of the two engagement members permanently move toward each other to be engaged with the ring groove.

9. The foldable pedal of claim 8, wherein the engagement portions of the engagement members are formed in a concave arc shape, and two linkage portions are disposed in opposite to the corresponding engagement portions, wherein each of the linkage portions is linked with one of the foot ends; at the engagement position, the two foot ends force the two linkage portions to lean in a direction away from the first axis, such that the engagement portions are engaged with the ring groove respectively; at the release position, the two operation members cause the deformation portion to elastically deform, so that the two foot ends no longer abut against the two linkage portions, and the two operation members push the two engagement members, thereby releasing an engagement between the two engagement portions and the ring groove.

10. The foldable pedal of claim 9, wherein the two engagement members are both formed in a ring shape and mounted around the connection member to be overlapped on the first axis; each of the linkage portions is formed in a notch to be combined with one of the corresponding foot ends; each of the foot ends passes through one of the corresponding operation members.

11. The foldable pedal of claim 10, wherein a transition section is arranged between the deformation portion and each of the foot ends, such that the two transition sections bend the two foot ends to extend in a direction parallel to the first axis.

12. The foldable pedal of claim 11, wherein the sleeve comprises two position limiting grooves respectively disposed on two sides of the sleeving bore and connected with the sleeving bore; at the engagement position, the two foot ends abut in the two position limiting grooves, respectively; at the release position, the deformation portion elastically deforms, such that the two foot ends slide toward the first axis along the two position limiting grooves.

* * * * *